(12) United States Patent
Mirmand et al.

(10) Patent No.: US 7,647,946 B2
(45) Date of Patent: Jan. 19, 2010

(54) SHEATH FOR PROTECTION OF A PIPE AGAINST IMPACTS, IN PARTICULAR FOR FUEL PIPES

(75) Inventors: Gérard Mirmand, Roissy-En-Brie (FR); Florence Castel, Crepy En Valois (FR)

(73) Assignee: Federal Mogul Systems Protection, Crepy-en-Valois (FR)

( * ) Notice: Subject to any disclaimer, the term of this patent is extended or adjusted under 35 U.S.C. 154(b) by 0 days.

(21) Appl. No.: 12/279,725

(22) PCT Filed: Feb. 26, 2007

(86) PCT No.: PCT/FR2007/000340

§ 371 (c)(1),
(2), (4) Date: Aug. 18, 2008

(87) PCT Pub. No.: WO2007/099219

PCT Pub. Date: Sep. 7, 2007

(65) Prior Publication Data

US 2009/0050226 A1 Feb. 26, 2009

(30) Foreign Application Priority Data

Feb. 28, 2006 (FR) .................................. 06 01762

(51) Int. Cl.
*F16L 11/00* (2006.01)
(52) U.S. Cl. ........................ 138/110; 138/123; 138/149
(58) Field of Classification Search ................. 138/110, 138/123–127, 149, 137, 138, 143, 144
See application file for complete search history.

(56) References Cited

U.S. PATENT DOCUMENTS

| | | | |
|---|---|---|---|
| 3,201,954 A | | 8/1965 | Greczin |
| 4,920,235 A | * | 4/1990 | Yamaguchi ................... 174/36 |
| 4,989,422 A | * | 2/1991 | Barlow et al. ................. 66/170 |
| 5,186,025 A | | 2/1993 | Neher |
| 5,613,522 A | * | 3/1997 | Ford et al. ................... 138/123 |
| 5,617,900 A | * | 4/1997 | Weil ........................... 138/127 |
| 5,933,914 A | * | 8/1999 | Beane ......................... 15/339 |
| 6,887,543 B1 | * | 5/2005 | Louart et al. ............... 428/36.9 |
| 6,953,061 B2 | * | 10/2005 | Della Putta et al. ......... 138/110 |
| 6,978,643 B2 | * | 12/2005 | Akers et al. .................. 66/170 |
| 7,013,929 B2 | * | 3/2006 | Laurent et al. .............. 138/123 |
| 7,469,563 B2 | * | 12/2008 | Wahlgren et al. ......... 66/169 R |
| 2004/0003630 A1 | | 1/2004 | Akers et al. |
| 2007/0261914 A1 | * | 11/2007 | Wahlgren et al. ........... 181/252 |
| 2008/0066499 A1 | | 3/2008 | Andrieu et al. |

FOREIGN PATENT DOCUMENTS

EP 0 987 359 A2 3/2000
FR 2 876 778 A 4/2006

* cited by examiner

*Primary Examiner*—Patrick F Brinson
(74) *Attorney, Agent, or Firm*—Young & Thompson

(57) ABSTRACT

A sheath for protecting a hose, particularly a fuel conduit, against shocks consists of a knitted tubular structure (10) with two faces, a first face (11) being made in the form of jersey and a second face (12) being made in the form of cotton fleece.

16 Claims, 2 Drawing Sheets

SHEATH FOR PROTECTION OF A PIPE AGAINST IMPACTS, IN PARTICULAR FOR FUEL PIPES

BACKGROUND OF THE INVENTION

The present invention relates to a sheath for protection of a pipe against impacts, in particular for fuel pipes.

The present invention applies generally to the protection of pipes for circulating fuel in automobile vehicles.

Fuel pipes are generally made of plastic and are fragile with regard to impacts. In particular, in the event of an accident to the vehicle, a part hitting a plastic fuel pipe risks piercing the pipe, thereby causing a fire due to the leakage of fuel.

In order to damp impacts on a fuel pipe, there exist rubber sleeves intended to cover the pipe. However, such rubber sleeves are difficult to slide over the plastic pipes.

There also exist plastic ducts conformed specifically to the shape of the fuel pipes to be protected. Such ducts are costly to fabricate, however, and must be specific to each application.

An object of the present invention is to propose a new impact protection sheath that removes the drawbacks cited above.

SUMMARY OF THE INVENTION

To this end, the present invention is directed to a sheath for protection of a pipe against impacts, in particular for fuel pipes, consisting of a tubular knitted structure with two faces, a jersey-knit first face and a molleton second face.

Thus a flexible tubular knitted structure that is simple to fabricate and to fit over fuel pipes of different diameters is provided. The tubular knitted structure adapts to different conformations of fuel pipes and may be positioned easily.

The jersey-knit face retains the knitted structure and provides mechanical strength and shear resistance in the protection sheath.

The molleton second face ensures damping of impacts thanks to the expanded structure of this second face.

In practice, the first face constitutes an external face of the protection sheath and the second face constitutes an internal face intended to come into contact with the pipe.

According to an advantageous feature of the invention, the second face consists of multifilaments with a linear density greater than or equal to 1 200 decitex and preferably greater than 2 000 decitex.

The use of a heavy yarn to produce the molleton face of the sheath ensures very good damping of impacts and prevents piercing of the fuel pipe covered in this way by the impact protection sheath.

To improve further the expanded structure of the molleton face, this second face consists of textured polymer multifilaments.

This impact protection sheath is preferably produced by circular knitting, thus enabling an economical textile process to be used for the production of the impact protection sheath conforming to the invention.

Other features and advantages of the invention will become further apparent in the course of the following description.

BRIEF DESCRIPTION OF THE DRAWINGS

In the appended drawings, provided by way of nonlimiting example.

DETAILED DESCRIPTION OF THE PREFERRED EMBODIMENTS

A sheath conforming to the invention for protection of a pipe against impacts will be described first with reference to FIGS. 1 and 2.

This impact protection sheath is intended to protect plastic pipes, and especially to protect fuel pipes used in automobile vehicles to prevent piercing of the pipe and leakage of fuel, in particular in the event of an accident to the automobile vehicle.

Figure 1:
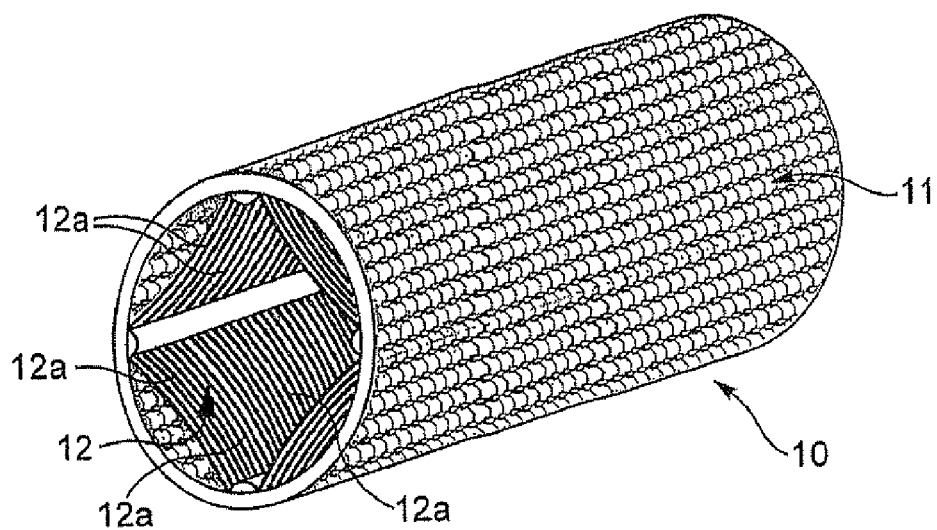
FIG. 1 is a perspective view of an impact protection sheath conforming to one embodiment of the invention.

As clearly shown in FIG. 1, the impact protection sheath 10 consists of a tubular knitted structure with two faces, a jersey-knit first face 11 and a molleton second face 12.

This type of knitted sheath can be produced by a circular knitting process enabling a closed tubular sheath with two faces to be knitted directly using the molleton technique.

In this embodiment, the jersey-knit first face 11 constitutes the external face of the protection sheath 10 and the second face 12 constitutes the internal face, intended to come into contact with the fuel pipe when the protection sheath is slid over such a pipe.

In this embodiment, the jersey-knit first face 11 and the molleton second face 12 are produced using a yarn of the same kind, for example polymer multifilaments, such as polyester or polyamide multifilaments.

Of course, different yarns could be used to produce the external face 11 and the internal face 12.

In particular, the jersey-knit first face 11 could be produced entirely from a monofilament or by combining a monofilament and multifilaments of types different from those used to achieve the expansion of the molleton second face 12.

The multifilaments used for the second face 12 are preferably sufficiently heavy to enable a thick internal face 12 capable of damping impacts to be obtained.

For example, the multifilaments used have a linear density greater than 2 000 decitex (2 000 g per 10 000 m of yarn).

Of course, other types of multifilaments may be used, provided that they have sufficient linear density, preferably greater than 1 200 decitex, or even 1 500 decitex.

Moreover, textured polymer multifilaments are preferably used to ensure expansion of the molleton second face 12.

In the conventional way, textured multifilaments may be used in accordance with the false twist (FT) process or the fixed false twist (FFT) process.

Of course, other texturizing processes could be used for the multifilaments employed in the impact protection sheath conforming to the present invention.

Thanks to circular knitting using a molleton technique, the second face of the protection sheath 10 consists of multifilament floats 12a.

The length of the floats 12a corresponds to a length of the tubular knitted structure from 3 to 10 needles, and preferably from 4 to 6 needles.

Figure 3:
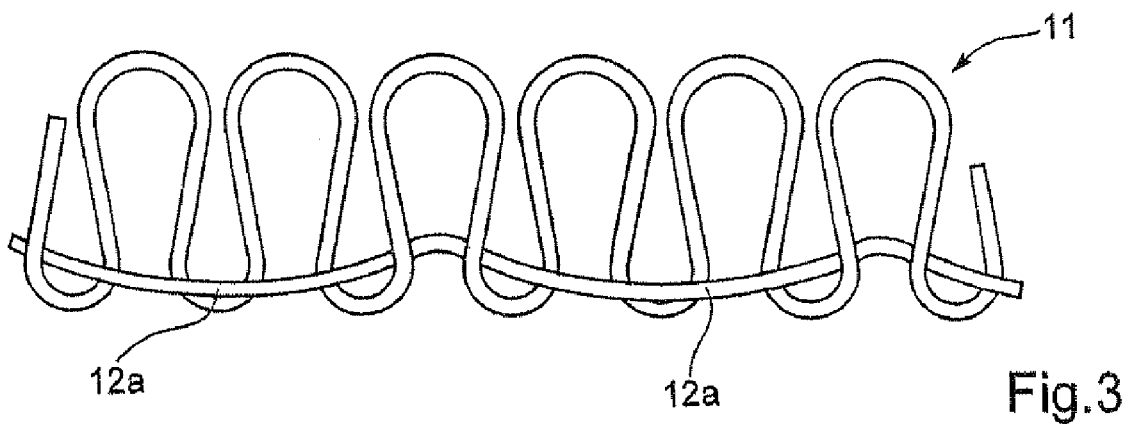
FIGS. 3 to 5 are diagrams showing different types of knitted structure used to constitute an impact protection sheath conforming to one embodiment of the invention.

FIG. 3 shows by way of example the production of a float in a knitted structure.

In this diagram, the length of the float 12a is equal to three needles, corresponding to three stitches of the jersey-knit first face.

The number of floats 12a in a cross section of the tubular knitted structure is preferably from three to six.

In the embodiment shown in FIG. 1, the number of floats 12a in the cross section is equal to four.

Figure 2:
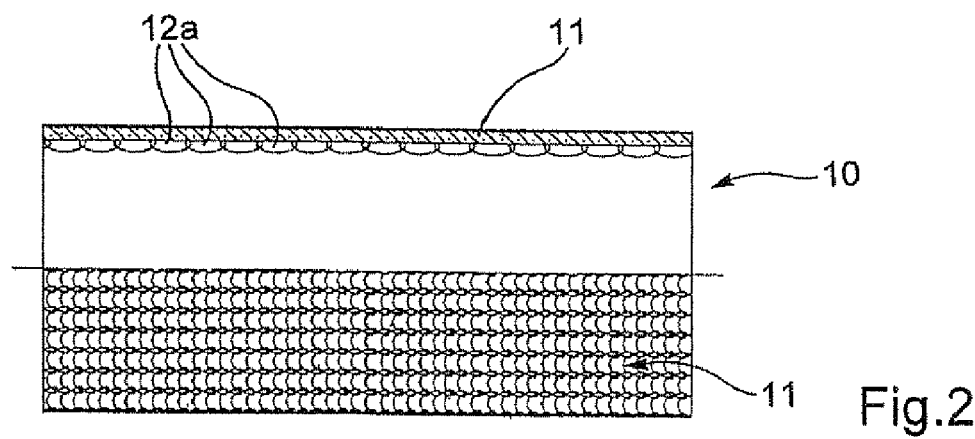
FIG. 2 is a view of the impact protection sheath from FIG. 1 in partial section.

As shown clearly in FIGS. 1 and 2, in this embodiment the floats 12a are woven into longitudinally aligned stitches of the jersey-knit first face 11, i.e. interwoven with the same warp filament.

Figure 4:
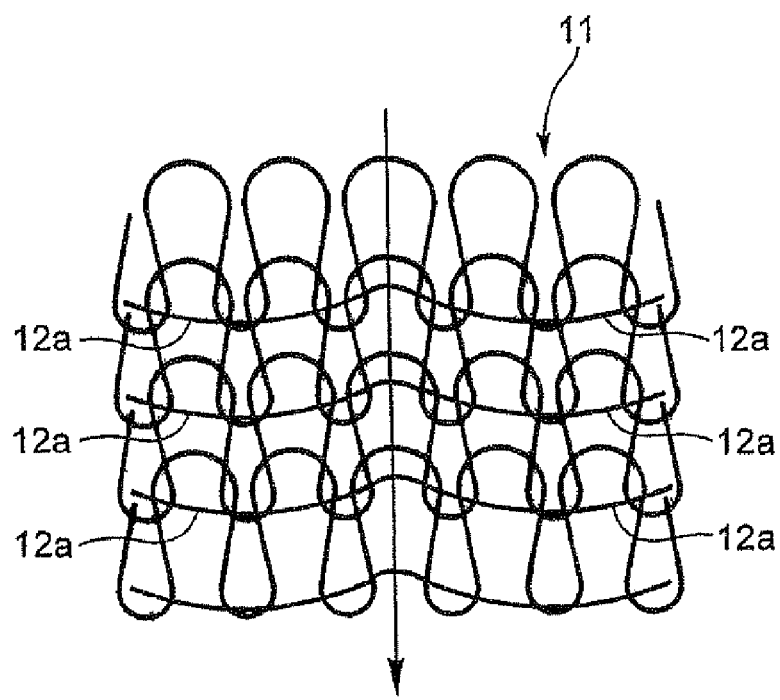

FIG. 4 shows an example of knitting for producing a molleton with floats 12a interlaced regularly with the jersey-knit structure 11.

Figure 5:
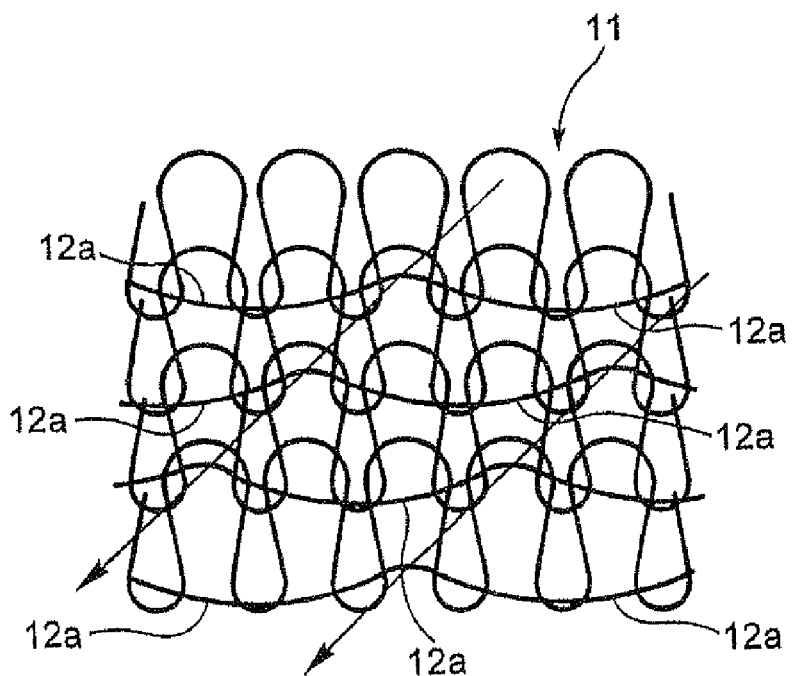

Of course, other types of knitting enabling a molleton technique to be employed may be used, and in particular, as shown in FIG. 5, a knitting technique in which the interlacing of the molleton filament is offset by one needle in each row (this technique is known as diamond molleton). The floats are then woven in a diamond configuration, the interlacing of the molleton filament being offset by one warp filament in each row.

Thanks to the molleton knitted structure, the filament constituting the internal face 12 of the sheath 10 is fixed to the external face 11, but not interlaced, so that the fibers may expand freely and thereby produce a heavy and thick layer for damping impacts on the sheath 10.

The molleton face provides sufficient damping with regard to impact. The Applicant has thus noted that the presence of such an impact protection sheath on a plastic pipe doubles the intrinsic impact resistance of this plastic pipe.

Moreover, the jersey-knit external structure retains the sheath and provides overall mechanical strength, in particular with regard to abrasion.

It will be noted in particular that for automotive applications such a sheath may be impregnated with a fire treatment product to improve the fire resistance of the sheath.

There is obtained in this way a textile sheath that is simple to fabricate by a circular knitting process and simple to fit to a fuel pipe, as much in terms of diameter as in terms of length.

In particular, the diameter of such an impact protection sheath 10 may be from five to twelve millimeters and preferably equal to eight or ten millimeters.

In order to stabilize the diameter of the impact protection sheath after it is knitted, it is possible to apply heat treatment to the protection sheath. Heating the sheath causes slight shrinkage of the polymer used in the knitted structure, to stabilize the diameter of the protection sheath 10.

In practice, fitting such a sheath is simple. Thanks to its flexible structure, it may be threaded onto a fuel pipe and positioned at any location, espousing perfectly the curves of the pipe.

It may preferably be cut to the required length by hot cutting. Hot cutting cauterizes the end of the protection sheath and thus avoids all risk of pollution by dust or filament debris during fitting.

The invention claimed is:

1. An impact protection sheath for protection of a pipe against impacts, comprising:
   a tubular knitted structure (10) with a jersey-knit first face (11) and a molleton second face (12),
   wherein said second face (12) consists of multifilament floats (12a).

2. The impact protection sheath according to claim 1, wherein said first face (11) constitutes an external face of the protection sheath (10) and said second face (12) constitutes an internal face configured to have contact with said pipe.

3. The impact protection sheath according to claim 1, wherein said second face (12) consists of multifilaments with a linear density greater than or equal to 1200 decitex.

4. The impact protection sheath according to claim 1, wherein said second face (12) consists of textured polymer multifilaments.

5. The impact protection sheath according to claim 1, wherein a length of the multifilament floats (12a) is from 3 to 10 needles of the tubular knitted structure (10).

6. The impact protection sheath according to claim 1, wherein a number of the multifilament floats (12a) in a cross section of said tubular knitted structure (10) is from 3 to 6.

7. The impact protection sheath according to claim 1, wherein the multifilament floats (12a) are woven into longitudinally aligned stitches of the jersey-knit first face (11).

8. The impact protection sheath according to claim 1, wherein the multifilament floats (12a) are woven in a diamond configuration.

9. The impact protection sheath according to claim 1, wherein said sheath is produced by circular knitting.

10. The impact protection sheath according to claim 5, wherein the number of multifilament floats (12a) in a cross section of said tubular knitted structure (10) is from 3 to 6.

11. The impact protection sheath according to claim 5, wherein the multifilament floats (12a) are woven into longitudinally aligned stitches of the jersey-knit first face (11).

12. The impact protection sheath according to claim 6, wherein the multifilament floats (12a) are woven into longitudinally aligned stitches of the jersey-knit first face (11).

13. The impact protection sheath according to claim 5, wherein the multifilament floats (12a) are woven in a diamond configuration.

14. The impact protection sheath according to claim 6, wherein the multifilament floats (12a) are woven in a diamond configuration.

15. The impact protection sheath according to claim 3, wherein the linear density of the multifilaments is greater than 2000 decitex.

16. The impact protection sheath according to claim 5, wherein the length of the multifilament floats (12a) is from 4 to 6 needles of the tubular knitted structure (10).

* * * * *